United States Patent
Frankel et al.

(10) Patent No.: US 11,196,504 B1
(45) Date of Patent: Dec. 7, 2021

(54) EXTENDING THE OPTICAL SPECTRUM OF AN OPTICAL NETWORK

(71) Applicant: Ciena Corporation, Hanover, MD (US)

(72) Inventors: Michael Y. Frankel, Bethesda, MD (US); David W. Boertjes, Nepean (CA); Loren S. Berg, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/082,218

(22) Filed: Oct. 28, 2020

(51) Int. Cl.
*H04J 14/02* (2006.01)
*G02B 6/293* (2006.01)

(52) U.S. Cl.
CPC ...... *H04J 14/0205* (2013.01); *G02B 6/29395* (2013.01); *H04J 14/0215* (2013.01); *H04J 14/0221* (2013.01)

(58) Field of Classification Search
None
See application file for complete search history.

(56) References Cited

U.S. PATENT DOCUMENTS

| | | | |
|---|---|---|---|
| 6,163,399 A | 12/2000 | Berg | |
| 6,335,562 B1 | 1/2002 | Dietrich et al. | |
| 6,430,336 B1 | 12/2002 | Frankel | |
| 6,496,297 B1 | 12/2002 | Frankel et al. | |
| 6,618,193 B1 | 9/2003 | Boertjes et al. | |
| 6,765,659 B1 | 7/2004 | Bhatnagar et al. | |
| 6,795,607 B1 | 9/2004 | Archambault et al. | |
| 6,907,201 B1 | 6/2005 | Frankel et al. | |
| 6,980,738 B1 | 12/2005 | Frankel et al. | |
| 7,184,410 B1 | 2/2007 | Frankel et al. | |
| 7,343,101 B1 | 3/2008 | Frankel et al. | |
| 7,369,300 B2 | 5/2008 | Sridhar et al. | |
| 7,415,208 B1 | 8/2008 | Haggans et al. | |
| 7,634,194 B2 | 12/2009 | Frankel et al. | |
| 7,693,357 B2 | 4/2010 | Marrakchi El Fellah et al. | |
| 7,853,156 B2 | 12/2010 | Grigoryan et al. | |
| 7,853,157 B2 | 12/2010 | Grigoryan et al. | |
| 7,962,049 B2 | 6/2011 | Mateosky et al. | |
| 8,005,375 B2 | 8/2011 | Frankel | |
| 8,045,855 B2 | 10/2011 | Frankel | |
| 8,260,141 B2 | 9/2012 | Berg | |
| 8,280,258 B2 | 10/2012 | Frankel | |

(Continued)

*Primary Examiner* — David W Lambert
(74) *Attorney, Agent, or Firm* — Clements Bernard Baratta; Lawrence A. Baratta, Jr.; Christopher L. Bernard (57) ABSTRACT

A method includes establishing an extended optical spectrum having multiple channels for transmission of signals within an optical network. The extended optical spectrum includes at least the C-band (i.e., 1530 nm to 1565 nm) plus one or more sub-bands each having a range of wavelengths including at least one optical channel outside the range of the C-band. The method also includes segmenting the extended optical spectrum into a local band and an express band having different transmission specifications. The local band is configured for transmission of signals between nodes having a relatively shorter distance therebetween and the express band is configured for transmission of signals between nodes having a relatively longer distance therebetween. A combination of the sub-bands covers less than the L-band having a range of wavelengths from 1565 nm to 1625 nm and/or less than the S-band having a range of wavelengths from 1460 nm to 1530 nm.

20 Claims, 3 Drawing Sheets

(56) References Cited

U.S. PATENT DOCUMENTS

| | | |
|---|---|---|
| 8,306,440 B2 | 11/2012 | Frankel |
| 8,364,036 B2 | 1/2013 | Boertjes et al. |
| 8,433,192 B2 | 4/2013 | Frankel et al. |
| 8,509,621 B2 | 8/2013 | Boertjes et al. |
| 8,554,074 B2 | 10/2013 | Boertjes et al. |
| 8,625,994 B2 | 1/2014 | Archambault et al. |
| 8,699,880 B2 | 4/2014 | Grigoryan et al. |
| 8,750,706 B2 | 6/2014 | Boertjes et al. |
| 8,787,771 B2 | 7/2014 | Frankel |
| 8,798,455 B2 | 8/2014 | Frankel |
| 8,818,206 B2 | 8/2014 | Frankel |
| 8,958,696 B2 | 2/2015 | Boertjes et al. |
| 8,971,705 B2 | 3/2015 | Boertjes et al. |
| 8,977,125 B2 | 3/2015 | Grigoryan et al. |
| 9,007,921 B2 | 4/2015 | Pelekhaty et al. |
| 9,077,474 B2 | 7/2015 | Boertjes et al. |
| 9,191,117 B2 | 11/2015 | Alexander et al. |
| 9,270,405 B2 | 2/2016 | Blair et al. |
| 9,344,191 B2 | 5/2016 | Al Sayeed et al. |
| 9,374,166 B2 | 6/2016 | Mateosky et al. |
| 9,419,725 B2 | 8/2016 | Grigoryan et al. |
| 9,485,013 B2 | 11/2016 | Al Sayeed et al. |
| 9,509,410 B2 | 11/2016 | Mateosky et al. |
| 9,515,767 B2 | 12/2016 | Frankel et al. |
| 9,551,836 B2 | 1/2017 | Frankel et al. |
| 9,577,763 B2 | 2/2017 | Al Sayeed et al. |
| 9,634,791 B2 | 4/2017 | Boertjes et al. |
| 9,806,808 B2 | 10/2017 | Bhatnagar et al. |
| 9,853,762 B2 | 12/2017 | Evans et al. |
| 9,973,295 B2 | 5/2018 | Al Sayeed et al. |
| 10,142,092 B2 | 11/2018 | Pelekhaty et al. |
| 10,153,860 B2 | 12/2018 | Boertjes et al. |
| 10,171,169 B2 | 1/2019 | Frankel et al. |
| 10,194,221 B2 | 1/2019 | Frankel et al. |
| 10,212,496 B2 | 2/2019 | Frankel et al. |
| 10,236,981 B2 | 3/2019 | Harley et al. |
| 10,237,011 B2 | 3/2019 | Al Sayeed et al. |
| 10,257,596 B2 | 4/2019 | Swinkels et al. |
| 10,263,386 B1 | 4/2019 | Sridhar et al. |
| 10,274,682 B2 | 4/2019 | Frankel et al. |
| 10,277,311 B2 | 4/2019 | Archambault et al. |
| 10,313,014 B2 | 6/2019 | Frankel et al. |
| 10,313,021 B1 | 6/2019 | Frankel et al. |
| 10,404,365 B2 | 9/2019 | Frankel et al. |
| 10,425,322 B2 | 9/2019 | Blair et al. |
| 10,455,300 B2 | 10/2019 | Swinkels et al. |
| 10,461,880 B2 | 10/2019 | Boertjes et al. |
| 10,536,235 B2 | 1/2020 | Al Sayeed et al. |
| 10,587,339 B1 | 3/2020 | Al Sayeed et al. |
| 10,680,739 B2 | 6/2020 | Swinkels et al. |
| 10,746,602 B2 | 8/2020 | Pei et al. |
| 10,749,602 B2 | 8/2020 | Charlton et al. |
| 2002/0167695 A1* | 11/2002 | Senturia ............... G02B 6/4246 398/87 |
| 2003/0042402 A1 | 3/2003 | Boertjes et al. |
| 2003/0058497 A1 | 3/2003 | Park et al. |
| 2003/0151802 A1 | 8/2003 | Berg et al. |
| 2004/0151426 A1 | 8/2004 | Boertjes et al. |
| 2005/0094252 A1 | 5/2005 | Haggans et al. |
| 2005/0100271 A1 | 5/2005 | Frankel |
| 2006/0023754 A1 | 2/2006 | Sridhar et al. |
| 2006/0127086 A1 | 6/2006 | Frankel |
| 2006/0139742 A1 | 6/2006 | Frankel et al. |
| 2006/0268394 A1* | 11/2006 | Sommer ............... G02B 6/2938 359/337.5 |
| 2007/0025730 A1 | 2/2007 | Frankel |
| 2007/0166032 A1 | 7/2007 | Frankel |
| 2007/0212064 A1 | 9/2007 | Boertjes et al. |
| 2007/0264024 A1 | 11/2007 | Zheng et al. |
| 2008/0298805 A1* | 12/2008 | Lee ........................ H04L 45/02 398/48 |
| 2010/0329686 A1* | 12/2010 | Frankel ............ H04B 10/25253 398/83 |
| 2015/0222360 A1 | 8/2015 | Boertjes et al. |
| 2015/0229404 A1 | 8/2015 | Boertjes |
| 2015/0229528 A1 | 8/2015 | Swinkels et al. |
| 2017/0310392 A1 | 10/2017 | Boertjes |
| 2018/0239522 A1 | 8/2018 | Campbell et al. |
| 2020/0036468 A1 | 1/2020 | Roberts et al. |
| 2020/0076499 A1 | 3/2020 | Al Sayeed et al. |
| 2020/0162172 A1 | 5/2020 | Sridhar et al. |

\* cited by examiner

EXTENDING THE OPTICAL SPECTRUM OF AN OPTICAL NETWORK

TECHNICAL FIELD

The present disclosure generally relates to optical networking systems and methods. More particularly, the present disclosure relates to systems and methods that allow network nodes of an optical network to operate within an extended spectral band of optical signals.

BACKGROUND

Generally, the fiber-optic communication industry is facing a capacity crunch, driven by relentless bandwidth growth. Recent reports indicate that growth rates ranging from about 26% to about 37% are expected. Much of this traffic growth is expected between users and data centers and between one data center and another.

Given these network bandwidth growth trends, the fiber-optic communication industry is focused on coming up with Capital Expenditures (CapEx) and Operating Expenditure (OpEx) efficient solutions. For example, there seems to be at least five hardware-centric options, each with their own associated tradeoffs, being pursued by the industry.

A first option for handling the increased growth in optical networks includes converting fixed-grid optical line systems to flexible grid systems, which has been a fast and simple way to obtain a short-term boost (e.g., about 20%) in capacity via improved spectral utilization. However, this expansion option has essentially been exhausted in commercial equipment, and network deployments of this equipment are proceeding apace.

A second option includes employing parallel optical line systems via either separate fiber strands or multi-core fiber Spatial Division Multiplexing (SDM). This option provides additional resilience against fiber or line system component failures.

A third option includes increasing the channel spectral efficiency using higher order modulation constellations. However, this option has diminishing returns since the addition of each two extra bits (i.e., a linear increase) results in about 3.5 dB decrease in reach performance (i.e., an exponential decrease).

A fourth option includes considering network infrastructures that might increase the Signal-to-Noise Ratio (SNR) or Optical SNR (OSNR). For example, some research is directed to the use of Ultra-Low-Loss (ULL) fibers. Given a fixed amplifier spacing and complete fiber replacement, a difference between conventional Single-Mode optical Fiber (SMF) (i.e., about 0.2 dB/km) and a ULL fiber (i.e., about 0.1424 dB/km) is about 4.6 dB, which produces about a 3 dB gain in SNR. Unfortunately, though, expected capacity gain (e.g., about 20%) is a one-time benefit, sufficient for about six months' worth of traffic growth.

A fifth option includes accessing an expanded fiber spectrum from C-band (i.e., 1530 nm to 1565 nm) to an extended C-band to include L-band (i.e., 1565 nm to 1625 nm). This option affords a more significant capacity increase of over 100% with a modest increase in line system cost and propagation penalty. Since this option appears to provide better results, the industry has moved toward solutions that operate within an extended band, particularly the amplification of optical signals within this extended band that are transported throughout an optical network.

However, the current state of extended band amplification systems (e.g., utilizing extended C-band and/or extended L-band) suffers from a lack of infrastructure in the field. Thus, to implement these extended band solutions, potentially expensive developments would be needed. Also, other issues have arisen with respect to the incorporation of this technology in optical networks.

Presently, companies providing optical services have indicated that they are reluctant to invest in the development of certain modules (e.g., Wavelength Selective Switching (WSS) components, Optical Channel Monitoring (OCM) components, contentionless WSS (CWSS) components, tunable filters, etc.) that could cover the extended spectral range. Although amplifiers may be relatively easy to design and build, there would normally be a delay in the availability of other modules (e.g., WSS components, etc.). It appears that there are currently no programs that have kicked off in this regard to incorporate this needed infrastructure to operate within the extended band.

Therefore, cost is usually restrictive in the development of extended band systems. Lower volumes (at least initially) will result in premium costs up front. Amplifier costs would increase due to extra power required to support the additional spectrum and to overcome the Gain Flattening Filter (GFF) losses. Also, Raman amplification would require an extra pump to avoid compromising gain and ripple. Therefore, there is a need in the field of optical communication networks to provide systems for handling the ever-increasing demand and to provide systems that can be implemented in a cost-effective way.

BRIEF SUMMARY

The present disclosure pertains to various systems and methods for extending the spectrum of optical channels. The C-band spectrum includes a band of wavelengths ranging from about 1530 nm to about 1565 nm and is commonly used for the transmission of optical signals. Some systems are being developed that not only operate in the C-band but are also configured for operating in the L-band, which includes an additional band of wavelengths ranging from about 1565 nm to about 1625 nm. However, the C+L band systems typically require separate transmission equipment for each of the separate bands. Therefore, the present disclosure provides systems in which the same equipment can be used for an "extended" band, whereby the extended band includes the C-band wavelength channels plus additional channels less than the entire L-band, as well as to shorter wavelengths in the S-band but not including the entire S-band. In this respect, the new spectrum described herein may be referred to as an "extended C-band." The extended C-band may push the bandwidths beyond just the C-band wavelengths to include wavelengths higher than the C-band (within part of the L-band) and wavelengths lower than the C-band (within part of the S-band). In some implementations, the spectrum may be expanded to includes wavelengths from about 1524 nm to about 1577 nm.

According to one implementation of the present disclosure, a method includes the step of establishing an extended optical spectrum having a plurality of optical channels for transmission of optical signals within an optical network. The extended optical spectrum may include at least the C-band plus one or more sub-bands, the C-band having a range of wavelengths from about 1530 nm to about 1565 nm. Each of the one or more sub-bands may have a range of wavelengths including at least one optical channel outside the range of the C-band. The method further includes the step of segmenting the extended optical spectrum into a local band and an express band having different transmission specifications. The local band may be configured for transmission of optical signals between nodes having a relatively shorter distance therebetween. The express band may be configured for transmission of optical signals between nodes having a relatively longer distance therebetween. The combination of the one or more sub-bands covers less than the L-band having a range of wavelengths from about 1565 nm to about 1625 nm and/or less than the S-band having a range of wavelengths from about 1460 nm to about 1530 nm.

According to another implementation of the present disclosure, a tunable edge filter may be configured to establish an extended optical spectrum having a plurality of optical channels for transmission of optical signals within an optical network. The extended optical spectrum may include at least the C-band plus one or more sub-bands, where the C-band has a range of wavelengths from about 1530 nm to about 1565 nm. Each of the one or more sub-bands may have a range of wavelengths including at least one optical channel outside the range of the C-band. The tunable edge filter may be further configured to segment the extended optical spectrum into a local band and an express band having different transmission specifications. The local band may be configured for transmission of optical signals between nodes having a relatively shorter distance therebetween, and the express band may be configured for transmission of optical signals between nodes having a relatively longer distance therebetween. The combination of the one or more sub-bands may cover less than the L-band having a range of wavelengths from about 1565 nm to about 1625 nm and/or less than the S-band having a range of wavelengths from about 1460 nm to about 1530 nm.

According to yet another implementation of the present disclosure, a node operating in an optical network in provided. The node may include an add/drop device configured to add and drop optical channels within an extended optical spectrum having a plurality of optical channels for transmission of optical signals within the optical network. The extended optical spectrum may include at least the C-band plus one or more sub-bands, wherein the C-band has a range of wavelengths from about 1530 nm to about 1565 nm. Each of the one or more sub-bands may have a range of wavelengths including at least one optical channel outside the range of the C-band. The node further includes a filter for segmenting the extended optical spectrum into a local band and an express band having different transmission specifications, wherein the local band may be configured for transmission of optical signals between nodes having a relatively shorter distance therebetween, and the express band may be configured for transmission of optical signals between nodes having a relatively longer distance therebetween. The combination of the one or more sub-bands may be configured to cover less than the L-band having a range of wavelengths from about 1565 nm to about 1625 nm and/or less than the S-band having a range of wavelengths from about 1460 nm to about 1530 nm.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for extending or expanding the spectral band for transporting optical signals within an optical communication system. There has been a push in the optical networking industry towards creating an extended band to increase the number of optical channels. Also, one focus of the present disclosure is to extend the optical spectrum for amplified transport systems.

Research in the field of extended band amplification has led to various systems using similar extended band concepts. Some solutions have included Raman-based extended bandwidth amplification line systems. Current Reconfigurable Optical Add/Drop Multiplexing (ROADM) components and Wavelength Selective Switching (WSS) components are traditionally designed to only operate inside the conventional C-band (i.e., a wavelength range from about 1530 nm to about 1565 nm). Since these components are generally designed only for this range, extension of the operational band would be expensive and may still take years to implement. Also, rare earth doped fiber amplifiers (e.g., Erbium-Doped Fiber Amplifiers (EDFAs)) normally have Gain Flattening Filters (GFFs) which are much more difficult to produce if the bandwidth coverage is extended. The extended band also negatively impacts the amplifier Noise Figure (NF) and gain ripple performance, and drives up the pump power requirements, thus making the EDFA less efficient.

In addition, extended band WSS components are possible to manufacture, but there is a balance between the number of pixels in the switching elements, the band of operation, and the effective filtering resolution which drives up WSS cost as the bandwidth increases. Also, as a result, the performance of the device may typically decrease. Modem micro-amplifiers may have different NFs across extended bandwidth. Micro-amplifiers may be single channel amplifiers and may be configured to cover only a portion of the system spectrum occupied by the modem. In some implementations, the micro-amplifiers do not need spectral flattening. Raman amplification may require extra pumps and may start having issues with overlap of Raman pump and data signal wavelengths.

Regarding performance and capacity, most system vendors today have implemented modems that operate across about 4.8 THz of the C-band spectrum (e.g., about 191.2 THz to about 196.0 THz). Going from about 4.8 THz to about 6.0 THz would be a 25% increase in available spectrum. Amplifier Noise Figures (NFs) and gain ripple would increase appreciably due to the number and depth of the GFFs. Modem micro-amps would also suffer from some amount of NF penalty. Even with additional GFFs, the ripple would be larger than existing amplifiers, which results in an Optical Signal-to-Noise Ratio (OSNR) penalty. Also, WSS bandwidth would degrade proportionally with the spectral range increase due to Liquid Crystal on Silicon (LCoS) resolution, although this issue could be addressed with next generation LCoS technology, which may still be years away.

One solution for extending the optical band can be found in a related patent (U.S. Pat. No. 8,280,258) having at least one common inventor, the disclosure of which is incorporated by reference herein. This issued patent anticipated the use of an extended band, where the optical spectrum can by partitioned into "express" and "local" components, where local transmission includes sending optical signals to an adjacent node located a relatively shorter distance away, while express transmission includes sending optical signals to an adjacent node located a relatively longer distance away. Some embodiments may be configured to place Optical Phase Conjugation into the "express" path to manage long-reach nonlinear effects. The present disclosure continues these concepts and includes further developments in this field, such as, for example, a one-band system and an overlapping sub-band system, as described below.

By providing an extended spectrum and splitting the spectrum into "express" and "local" band, the express paths can be used herein to avoid the limitations outlined above with respect to conventional systems. In the present disclosure, ROADMs and associated components can be used only in the local path and over the currently defined C-band spectrum. Optimal optical power density is somewhat independent of reach (i.e., about the same in both paths). Optimal optical power density is also somewhat independent of the modulation format, although achievable reach may be sensitive to constellation cardinality.

In an example, an optical network is an optical communication system serving various locations across a geography, e.g., North America. It may be noted that smaller networks (e.g., European optical networks) may provide more opportunities for implementing the extended band systems and methods described in the present disclosure, particularly for separating express and local channels. However, even continental-sized North American networks may provide sufficient opportunity for implementing a reasonable separation between express and local connections. Additionally, such network configuration could be a good fit for global cloud networks, which may need high-capacity "express" connections between centralized data center locations.

The optical network includes a plurality of nodes and in a nationwide network (U.S.), the major inter-node distances may be about 500 to 1000 km. The distance across North America is about 4000 km. The optical network would intuitively benefit from long optical reach and transparency.

The major driver for extended band operation is the efficient use of the transmission fiber asset. Since spectral efficiency gains are slowing as the transponder encoding and decoding technologies approach the Shannon Limit, the capacity per fiber is not expected to increase significantly without an increase in the useable transmission bandwidth. One option for extended band in the transmission fiber is the use of all-Raman amplification. A limitation of an all-Raman extended band system, however, is the ability to provide bulk gain elements for ROADM components, add/drop components, and transponders/modems/transceivers. As noted above, designing EDFAs with the same bandwidth as an all-Raman transmission portion would be expensive and complex and may result in inferior noise performance.

Nevertheless, the present disclosure is directed to advancing the extended band concept by introducing various novel features. The systems and methods described in the present disclosure may include embodiments that can be grouped into two categories based on the approach taken to segregate the band. A first category may be referred to as a "one-band system" and the second category may be referred to as an "overlapping sub-band system."

One-Band System

The "one-band system" may include a setup where EDFAs and/or Raman amplifiers cover a continuous spectrum. The EDFAs and Raman amplifiers do not need to cover the same spectrum, as indicated below regarding an express gain ripple being outside of a ROADM window that can be equalized by a separate Dynamic Gain Equalization (DGE) module.

In the one-band system, a tunable filter (e.g., an edge filter or fixed filter) can be used to split the overall spectrum into express and local bands. The local band may serve shorter connections with fewer spans and may include less expensive (lower performing) amplifiers, such as Semiconductor Optical Amplifiers (SOAs).

Also, the express band, in some embodiments, may be further split into "normal-express" and "ultra-express" subbands. A Gain Flattening Filter (GFF) may be used to provide tighter flatness specifications in the express band. The flatness characteristics may have looser specifications in the local bands. This may result in a simplified GFF design, reduced costs, and reduced insertion loss, thereby improving Noise Figure (NF) especially in the express portion of the band.

In some preferred embodiments, the express channels may be placed in longer wavelengths if the stimulated Raman pumping is beneficial, as induced by co-propagating "local" channels. When external Raman pumps are used, the pump wavelengths may be arranged to provide gain to express channels, thereby minimizing overall system cost and power. Although gain tilt in the transition regions may be a problem, this may be mitigated by ROADM channel power control. Also, express gain ripple may be outside of a ROADM window, equalized by a separate DGE module.

Thus, the one-band system can include different components across different portions of the one band. Also, local and express (as well as normal-express and ultra-express) traffic can be segmented in different portions on the one band, as described herein.

Overlapping Sub-Band System

The overlapping sub-band system may be split into two functional segments: a) extended-band transmission and b) photonic functions (e.g., ROADM, add/drop, and transponder functions), where the photonic functions require bulk amplification. The photonic functions may be separated into sub-bands where each sub-band is a portion of the full band. In some cases, each sub-band may overlap in frequency (wavelength) with at least one other sub-band. The purpose for this overlap may be to allow for the design of bulk amplifiers (e.g., EDFAs), which provide high performance and high efficiency in each sub-band of interest. It may be difficult to create an EDFA with a gain region which drops sharply at the edges of the band. By allowing the sub-bands to overlap, this restriction is essentially eliminated. When channels from different spectral sub-bands are split and then recombined, the spectrum can be filtered to prevent Multi- Path Interference (MPI) or cross-talk from other sub-bands. While the sub-bands are spatially separated into parallel sub-band paths inside "photonic functions," the spectrum, in some cases, may not need to be sharply truncated. However, such truncation can be performed when the spatial paths are recombined, i.e., via tunable filters, as described below.

In the overlapping sub-band system, the WSS technology may follow the same or similar design paradigm. The cost tradeoff of multiple WSS modules vs. a single wideband module is not as strong as the EDFA modules, but this is expected to be offset at the system level by allowing the system to selectively deploy only the WSS modules needed for the processed sub-bands at a given site.

The transponders/modems/transceivers in the overlapping sub-band system can also be designed in sub-bands thereby simplifying the micro-EDFA design and retaining the noise performance within those bands.

The overlap in the gain ranges of the sub-bands does require filtering at the system boundary between sub-band photonics and the extended band transmission to prevent crosstalk and multipath interference. This is achieved through a combination of the WSS modules in combination with two or three port optical filters.

Operating Principles

Figure 1A:
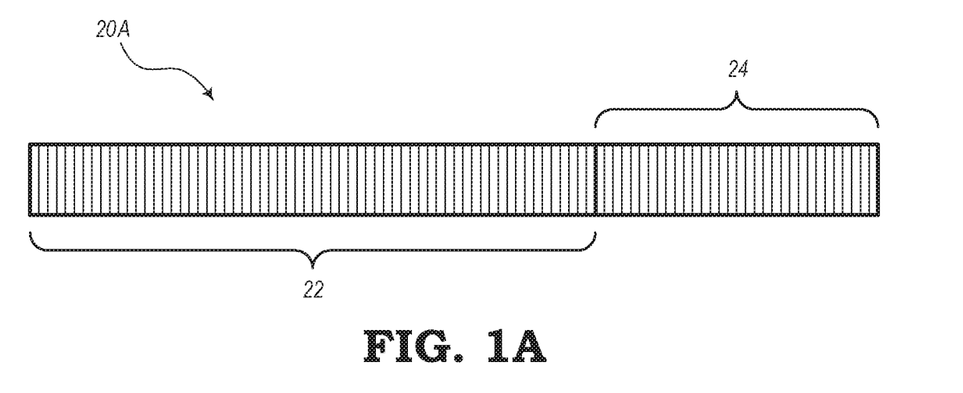
FIG. 1A is a diagram illustrating a first extended optical spectrum having multiple segments of optical sub-bands, according to various embodiments of the present disclosure.

FIG. 1A shows a representation of a first extended optical spectrum 20A for the transmission of optical signals. The optical spectrum 20A may be viewed as being "extended" in the sense that it extends beyond the normal C-band (e.g., about 1530 nm to about 1565 nm) range. According to various embodiments of the present disclosure, the extended optical spectrum 20A may then be partitioned into certain sub-bands. For example, the extended optical spectrum 20A may include a "local" sub-band 22 and an "express" sub-band 24. The local sub-band 22 may include a conventional ROADM passband, which may include up to 88 optical channels divided into 50 GHz bands and may be similar to or the same as the frequency range of the C-band (e.g., about 191.2 THz to about 196.0 THz). Also, the local sub-band 22 may include ROADM-based collector and grooming. In some embodiments, the express sub-band 24 may include up to about 40 channels divided into 50 GHz bands. The express sub-band 24 may be band-based and may be ungroomed.

Figure 1B:
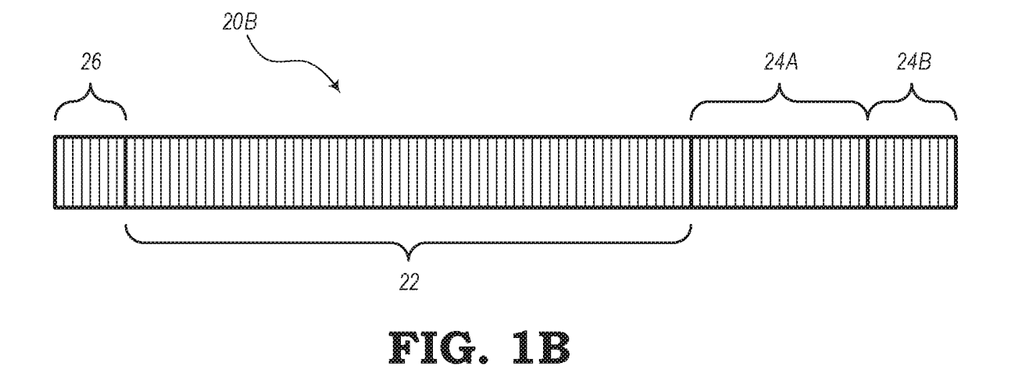
FIG. 1B is a diagram illustrating a second extended optical spectrum having multiple segments of optical sub-bands, according to various embodiments of the present disclosure.

The express sub-band 24 may be separated from the local sub-band 22 by using a tunable passband filter. In some embodiments, the tunable passband filter may be configured to further divide the express sub-band 24 into multiple additional sub-bands, as depicted in FIG. 1B. For example, from the channels of the express sub-band 24, the tunable passband filter may divide the express sub-band 24 at least into a "normal-express" sub-band 24A and an "ultra-express" sub-band 24B. According to some embodiments, the ultra-express sub-band 24B may include wavelengths that are separated from the local sub-band 22 by the normal-express wavelengths.

Thus, the embodiments of the present disclosure may use a tunable filter (e.g., an edge filter) to separate the local sub-band 22 from the express sub-band 24 (or express sub-bands 24A, 24B). The filtering may occur at express nodes in the network, which may include those nodes that are more greatly separated from other nodes in the network. Also, express channels can be bypassed in local nodes. The tunable edge may be aligned at the edge of conventional C-band (e.g., at about 1565 nm). The edge may be defined by the ROADM boundary, but may also overlap with the conventional ROADM passband. In some embodiments, the edge may also be separated by a dead zone gap, although this may be considered in some cases to be a waste of spectrum.

According to another embodiment, the second extended optical spectrum 20B of FIG. 1B shows the local sub-band 22 and the express sub-bands 24A, 24B. Also, the extended optical spectrum 20B may include a lower sub-band 26 having wavelengths lower than the local sub-band 22 including channels of the C-band. In this respect, the wavelengths of the extended optical spectrum 20B may extend from both ends of the C-band, where the lower sub-band 26 includes shorter wavelengths (and higher frequencies) than the C-band and the express sub-bands 24A, 24B include longer wavelengths (and lower frequencies) than the C-band.

According to the various embodiments of the present disclosure, a conventional C-band (i.e., about 1530 nm to 1565 nm) could be extended to an extended band (or super C-band). For example, the extended band may range from about 1524 nm to about 1577 nm. In this case, the lower sub-band 26 may include wavelengths ranging from about 1524 nm to 1530 nm. The local sub-band 22 may include wavelengths ranging from about 1530 nm to about 1565 nm. Also, the express sub-bands may include wavelengths ranging from about 1565 nm to about 1577 nm.

The extreme regions of this extended optical spectrum 20A, 20B, which may include one or more of sub-bands 22, 24, 24A, 24B, 26, may include operating specifications that may be higher than the specifications for the C-band range (e.g., the local sub-band 22). With higher specifications, these sub-bands may be used for allowing express traffic to flow under the higher specifications. For example, the amplification in sub-bands 24, 24A, 24B, 26 may have greater performance than amplification in the local sub-band 22.

The magnitude to which the extended band may be extended may be factor of the size of the network and how far apart the various nodes are positioned from each other. For example, if a large percentage of the network nodes are located far apart, thereby benefiting from communication along the express sub-bands 24A, 24B, then the extended band may be extended by a larger amount. However, if a low percentage of the network nodes are located far apart (e.g., such as in some European networks), then the extended band may be extended to a lesser amount since most traffic may be considered to be local traffic. Thus, the range of the entire extended spectrum may be modified as needed according to how many channels may be needed for express traffic (and how many channels may sufficiently be used for local traffic).

The better transmission specification may be given to the extremes of the extended optical spectrums 20A, 20B, which may include, for example, the express sub-bands 24, 24A, 24B and, in some embodiments, may further include the lower sub-band 26. For instance, the better transmission specifications may include lower loss in the fibers, better (lower) Noise Figures (NFs), etc. Also, Raman amplifiers may be configured to operate better in the extremes of the extended optical spectrums 20A, 20B. Also, the Stimulated Raman Scattering (SRS) losses may be based on a narrower spectrum and may be less in the extremes.

The local sub-band 22 may correspond to part or all of the C-band, which includes frequencies ranging from about 195.90 THz to about 191.55 THz, which may include 88 channels each spaced by 50 GHz. These frequencies corresponding to wavelengths ranging from about 1530 nm to about 1565 nm. The express sub-band 24 and/or express sub-bands 24A, 24B may include wavelengths ranging from about 1565 nm to about 1577 nm.

Figure 2:
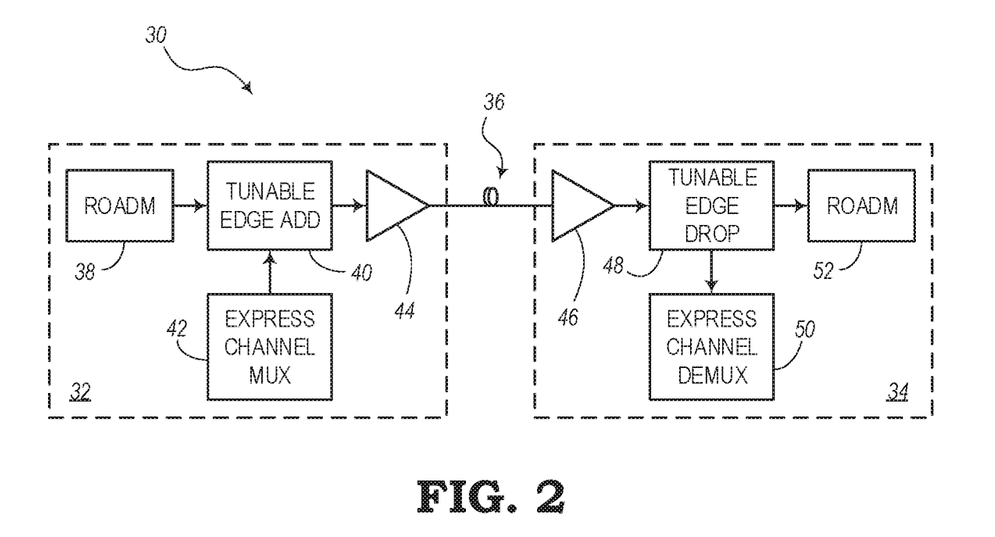
FIG. 2 is a diagram illustrating a portion of an optical network where a first network node transports optical signals consuming channels in both a local band and an express band of an extended optical spectrum to a second network node, according to various embodiments of the present disclosure.

FIG. 2 is a diagram illustrating an embodiment of a portion 30 of an optical network where a first node 32 transports optical signals consuming channels over the entire extended spectrum (e.g., the first extended optical spectrum 20A, the second extended optical spectrum 20B, or other suitable extended range). Thus, transmission is made in both the local sub-band 22 (e.g., C-band) and any additional sub-bands (e.g., express sub-bands 24, 24A, 24B, lower sub-band 26, etc.) to a second node 34.

Optical signals are transported over a transmission fiber 36 having multiple spans, including the local sub-band 22 and express sub-band 24. The first node 32 includes a ROADM 38 that operates in a conventional manner for transmitting and receiving C-band spectrum signals with "local" nodes. For transporting optical signals over the transmission fiber 36, the first node 32 includes a tunable edge add component 40, an express channel multiplexer 42, and a post-amplifier 44. The signals are transmitted over the transmission fiber 36 and received by the second node 34. The second node 34 includes a pre-amplifier 46, a tunable edge drop component 48, an express channel demultiplexer 50, and a ROADM 52.

The tunable edge add component 40 and the tunable edge drop component 48 may be referred to as "tunable edge filters" and may be configured to tune the respective node for operation in one or more of the sub-bands described with respect to FIGS. 1A and 1B. Also, the tunable edge add component 40 and the tunable edge drop component 48 may include an add/drop device for adding and/or dropping channels based on the sub-bands to which the tunable edge filter is tuned when located at an express node. According to some embodiments, a network node may include both a filter (e.g., tunable edge filter) and an add/drop device for adjusting to the particular extended band in which the node is configured to operate. The tunable edge add component 40 and the tunable edge drop component 48 may include a bypass function such that express channels bypass ROADM components 38 and 52 when located at a local node.

It should be noted that FIG. 2 shows the transmission of signals in a single direction (i.e., from the first node 32 to the second node 34). However, it should be understood that communication may be bi-directional, where the second node 34 may transmit signals in the opposite direction over the transmission fiber 36 to the first node 32. In this respect, the first and second nodes 32, 34 may each include the components for receiving or transmitting, respectively, described with respect to the other node.

The ROADM 38 of the first node 32 provides add/drop functionality for "local" channel spectrum coverage. The tunable edge add component 40 of the first node 32 is configured to define the separation of the optical spectrum 20 into the two or more sub-bands (e.g., local sub-band 22 and express sub-band 24). The express channel multiplexer 42 may be a low-cost, static component implemented using Arrayed-Waveguide Grating (AWG) filters. Alternatively, the express channel multiplexer 42 can be a more complex WSS-based structure, but with WSS components required to cover only a limited spectrum range.

The second node 34 includes the tunable edge drop component 48 for removing the express channels and sending these express channel signals to the express channel demultiplexer 50 for processing. The local channels separated by the tunable edge drop component 48 are provided to the ROADM 52 for normal processing of the local channels.

In this embodiment, the first node 32 may use the same components across the entire extended spectrum 20A, 20B. However, according to the implementations described in the present disclosure, these components may be utilized in a way where the filtering procedure includes segmenting the spectrum into two or more sections having different specifications (e.g., Noise Factor (NF), gain ripple, etc.). Therefore, instead of attempting to maintain the same specifications for each partial spectrum, the components may be modified from conventional components to allow them to either operate over the entire extended band or to split them up to operate over one (or more) of the partial spectrums.

According to some embodiments, the channels (e.g., channels of the local sub-band 22) having higher specifications (e.g., less noise and gain ripple) may be allocated for regions of the network having a longer reach, which may include the additional channels (e.g., channels in sub-bands 24, 24A, 24B, 26) at the extremes of the extended band. Also, the local sub-band 22 may include channels that are allocated for shorter reach applications. For example, a longer reach application (e.g., Boston to Chicago) for connection between nodes that are located relatively farther apart may be configured to operate with the express sub-band 24, while a shorter reach application (e.g., Philadelphia to New York) for connection between nodes that are located relatively closer together may be configured to operate with the local sub-band 22. The lower sub-band 26 may be grouped with express sub-bands or the local sub-band 22 and thereby may be allocated as either express band or a local band.

The tunable edge add component 40 and tunable edge drop component 48 may be configured as WSS components for add/drop functions with the added functional characteristic of enabling a tunable filtering process to split the continuous extended band into sub-bands for operation within one or more of the sub-bands. The express channels (e.g., sub-bands 24, 24A, 24B, 26) can be added by the express channel multiplexer 42 and dropped by the express channel demultiplexer 50. The filters of the tunable edge add component 40 and tunable edge drop component 48 may be configured to split the continuous spectrum or split one of the sub-bands (e.g., express sub-band 24).

Figure 3:
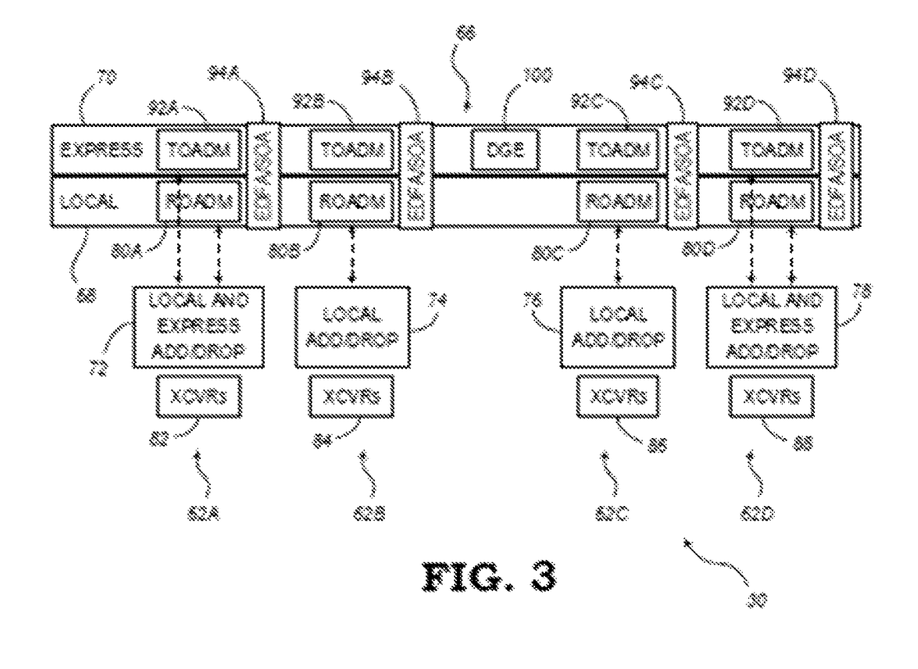
FIG. 3 is a diagram illustrating the portion of the optical network of FIG. 2 from a perspective of the entire extended optical spectrum, according to various embodiments of the present disclosure.

FIG. 3 is a diagram showing the portion 30 of the optical network shown in FIG. 2 from a perspective of the entire optical spectrum as extended with respect to the various embodiments of the present disclosure. As shown in FIG. 3, the portion 30 may include bi-directional communication between a first express node 62 and a second express node 64. Communication between adjacent pairs of nodes 62A, 62B, 62C, 62D may include an extended spectrum 66, which includes a local band 68 and an express band 70. Handling of local channels in the local band 68 can be performed separately from the handling of express channels in the express band 70.

Each node 62A, 62B, 62C, 62D is capable of processing both local channels and express channels. In this example, the first (express) node 62A includes an add/drop component 72 for multiplexing and demultiplexing channels in both the local band 68 and the express band 70. A local add/drop component 74 of the second (local) node 62B is configured for multiplexing and demultiplexing channels in just the local band 68. Similarly, the third (local) node 62C includes a local add/drop component 76 for multiplexing and demultiplexing channels in just the local band 68. The fourth (express) node 62D includes an add/drop component 78 for multiplexing and demultiplexing channels in both the local band 68 and the express band 70. The add/drop components 72, 74, 76, 78 connect the corresponding ROADM components 80A, 80B, 80C, 80D in the local band 68 and the TOADM components 92A, 92D in the express band 70 and also connect to corresponding transceivers 82, 84, 86, 88, respectively.

In an example where nodes 62A and 62D are considered to be "express" nodes and nodes 62B and 62C are considered to be "local" nodes, the express nodes 62A, 62D use the TOADM components 92A, 92D for add/drop while the local nodes 62B, 62C use the TOADM components 92B, 92C for bypass of the express channels. The express channels will bypass the ROADM components 80B, 80C at the local nodes 62B, 62C, but will be added/dropped by the ROADM components 80A, 80D at the express nodes 62A, 62D.

The overall system of the portion 30 of the optical network includes a Dynamic Gain Equalizer (DGE) element 100, which covers exclusively the express band 70, as shown in FIG. 3. Spectrum equalization on the local band 68 may be accomplished conventionally through the ROADM components 80.

In some embodiments, the express add/drop components 72, 78 may be configured as WSS components for operations with the ROADM components 80 and/or TOADMs 92. The express add/drop components 72, 78, according to various embodiments, may include reflective ports that are not controlled. The reflective ports may have flat reflective surfaces that are configured to reflect to a single port. Thus, the channels outside of the normal control pixels for the components 72, 78 may fully reflect off the reflective surfaces to the single port. This reflective characteristic may be applied to other bands or sub-band regions by causing outside channels to reflect to one port. For example, the unused channels may be reflected to the express band. The rest of the channels (e.g., in-band channels) may be pixelized by the corresponding ROADM component 80.

Figure 4:
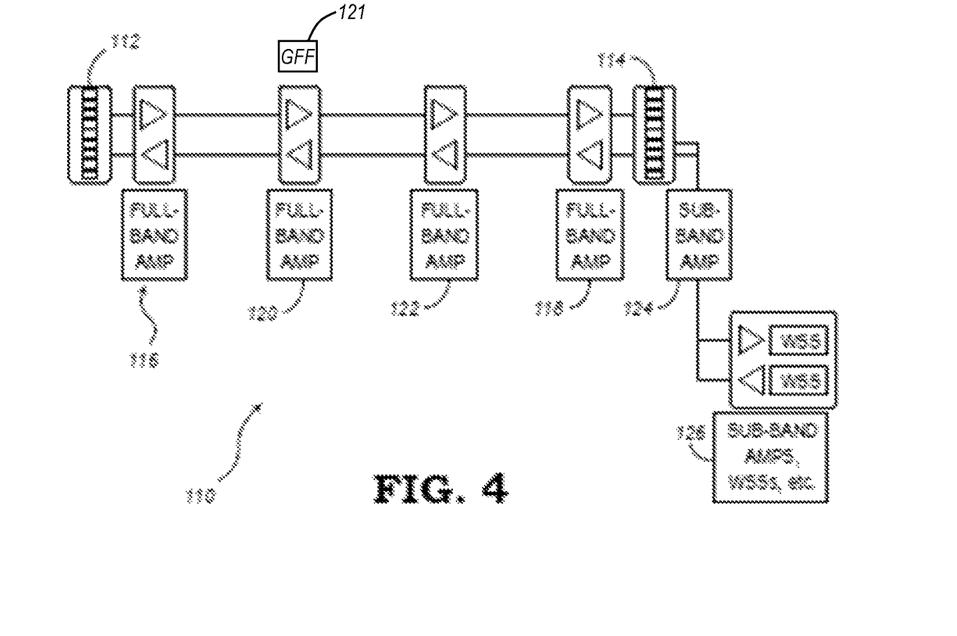
FIG. 4 is a diagram illustrating a segmented band transmission system, according to various embodiments.

FIG. 4 is a diagram illustrating an embodiment of a segmented band transmission system 110 for transmission of extended band optical signals between a first express node 112 and a second express node 114. The first express node 112 includes a full-band amplifier device 116 configured for amplifying the entire extended band (e.g., optical spectrum 20A, 20B) from output ports of the first express node 112. The optical signals amplified by the full-band amplifier device 116, associated with the first express node 112, are transmitted to a full-band amplifier device 118 associated with the second express node 114. In the opposite direction, optical signals from the second express node 114 are amplified by post-amplifier elements of the full-band amplifier device 118 and transmitted to the first express node 112 having pre-amplifier elements of the full-band amplifier device 116. Also, intermediate nodes or line amplifiers are positioned between the nodes 112, 114 and may include one or more full-band amplifiers. In FIG. 4, two intermediate full-band amplifier devices 120, 122 are shown.

The full-band amplifier devices 116, 118, 120, 122 are configured as bi-directional devices and are configured to amplify the optical signals covering the entire extended spectrum (e.g., 20A, 20B), which may include the C-band plus additional wavelengths. The express nodes (e.g., second express node 114) may further include a sub-band amplifier 124 having filtering for processing of local and/or express signals. The filters of the sub-band amplifier 124 may be connected to sub-band components 126 (e.g., amplifiers, WSS components, etc.) for handling local channels of the optical spectrum. In embodiments, the full-band amplifier devices 116, 118, 120, 122 includes at least one Gain Flattening Filter (GFF) 121.

The sub-band components 126 (e.g., amplifiers, WSSs, etc.) may be implemented with Rare-Earth Doped Fiber Amplifiers (REDFAs), SOAs, and/or Raman amplifiers. For sub-band applications, the REDFAs may be configured as micro-REDFAs that maintain noise performance with the respective sub-band. However, in the "one-band" application, the components may be configured to extend across the whole band, where the performance of the band is segregated with different specifications. Some components may be configured for full-band transmissions, while others may be configured to transmit over only a portion (e.g., one or more the sub-bands 22, 24, 24A, 24B, 26) of the entire spectrum. It should also be recognized that the components may be configured to operate in sub-bands that overlap with other sub-bands and/or may operate such that the components themselves have overlapping ranges that overlap at any points along the entire spectrum.

The embodiments of the present disclosure may include certain advantages over conventional system. For example, it may be noted that the present disclosure provides an option for Service Providers (SPs). For a small network (e.g., a European network), the present disclosure offers an option to separate express and local channels from each other for processing in two different ways. However, even continental-sized networks (e.g., a North American network) may provide sufficient opportunity for implementing a reasonable separation between local and express connections.

Also, the embodiments of the present disclosure may also be utilized by Global Cloud Providers. As such, the disclosed network configuration may be a good fit for Global Cloud Network companies, which may need high-capacity express connections between centralized data center locations.

When extending these optical wavelength bands, there may inherently be a range of performance across the spectrum that necessitates a need to differentiate traffic to particular bands based on performance. The present disclosure targets practical system-level design considerations (not lab-type concepts) with cost and complexity being some of the important parameters to consider in the creation of the extended spectrum.

Figure 5:
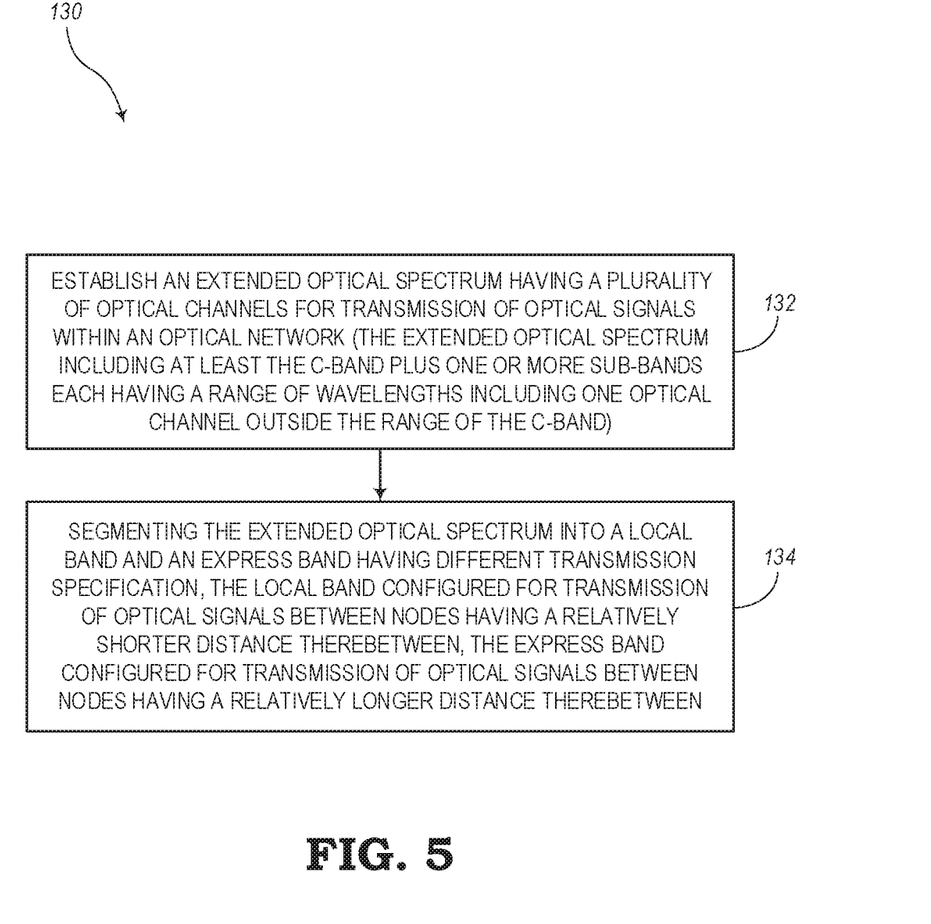
FIG. 5 is a flow diagram illustrating a process for creating an extended optical spectrum, according to various embodiments.

FIG. 5 is a flow diagram illustrating an embodiment of a process 130 for creating an extended optical spectrum for use in an optical network. In this embodiment, the process 130 may include the step of establishing an extended optical spectrum having a plurality of optical channels for transmission of optical signals within an optical network, as indicated in block 132. The extended optical spectrum may include at least the C-band plus one or more sub-bands, where the C-band has a range of wavelengths from about 1530 nm to about 1565 nm. Each of the one or more sub-bands may have a range of wavelengths including at least one optical channel outside the range of the C-band. The process 130 may further include the step of segmenting the extended optical spectrum into a local band and an express band having different transmission specifications. The local band may be configured for transmission of optical signals between nodes having a relatively shorter distance therebetween, and the express band may be configured for transmission of optical signals between nodes having a relatively longer distance therebetween. In some embodiments, a combination of the one or more sub-bands may cover less than the L-band, which has a range of wavelengths from about 1565 nm to about 1625 nm.

According to additional embodiments, the process 130 may be further defined, whereby the combination of the one or more sub-bands may cover less than half of the L-band. The one or more sub-bands may include a lower sub-band having a wavelength range with wavelengths less than the C-band, whereby the wavelength range of the lower sub-band may be less than half the range of wavelengths of the C-band. The step of establishing the extended optical spectrum may include establishing a range of wavelengths from about 1524 nm to about 1577 nm.

The process 130 may also be defined such that the specifications include one or more of Noise Factor (NF) and gain ripple. The transmission specifications of the express band may enable the optical signals transmitted by way of the express band to have a longer reach than the local band. The step of segmenting the extended optical spectrum may include segmenting bands that overlap.

The process 130 may further comprise the step of segmenting the express band into a normal express band and an ultra-express band, wherein the ultra-express band enables a longer reach than the normal express band. Also, the process 130 may further include the step of modifying the operating parameters of a plurality of optical components of a network node to enable the network node to operate over the extended optical spectrum. The process 130 may also include the step of enabling one or more of the optical components to operate over the entire extended optical spectrum and the step of enabling one or more others of the optical components to operate over one of the express bands and the local band.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A method comprising the steps of
   establishing an extended optical spectrum having a plurality of optical channels for transmission of optical signals within an optical network, the extended optical spectrum including at least the C-band plus one or more sub-bands, the C-band having a range of wavelengths from about 1530 nm to about 1565 nm, and each of the one or more sub-bands having a range of wavelengths including at least one optical channel outside the range of the C-band, and
   segmenting the extended optical spectrum into a local band and an express band having different transmission specifications, the local band configured for transmission of optical signals between nodes having a relatively shorter distance therebetween, the express band configured for transmission of optical signals between nodes having a relatively longer distance therebetween,
   wherein a combination of the one or more sub-bands covers less than the L-band having a range of wavelengths from about 1565 nm to about 1625 nm and/or less than the S-band having a range of wavelengths from about 1460 nm to about 1530 nm, and
   wherein the extended optical spectrum is amplified by one or more of Erbium Doped Fiber Amplifiers and Raman amplifiers that cover a continuous spectrum in a one-band system and with at least one Gain Flattening Filter (GFF) having a tighter flatness specification in the express band than a flatness specification in the local band.

2. The method of claim 1, wherein the combination of the one or more sub-bands covers less than half of the L-band.

3. The method of claim 1, wherein the one or more sub-bands includes a lower sub-band having a wavelength range with wavelengths in the S-band, the wavelength range of the lower sub-band being less than half the range of wavelengths of the C-band.

4. The method of claim 1, wherein establishing the extended optical spectrum includes establishing a range of wavelengths from about 1524 nm to about 1577 nm.

5. The method of claim 1, wherein the transmission specifications include one or more of Noise Factor (NF) and gain ripple.

6. The method of claim 1, wherein the transmission specifications of the express band enable the optical signals transmitted by way of the express band to have a longer reach than the local band.

7. The method of claim 1, wherein segmenting the extended optical spectrum includes having the one or more sub-bands overlap one another.

8. The method of claim 1, further comprising the step of segmenting the express band into a normal express band and an ultra-express band, wherein the ultra-express band enables a longer reach than the normal express band.

9. The method of claim 1, further comprising the step of modifying operating parameters of a plurality of optical components of a network node to enable the network node to operate over the extended optical spectrum.

10. The method of claim 9, further comprising the step of enabling one or more of the optical components to operate over the entire extended optical spectrum and the step of enabling one or more others of the optical components to operate over one of the express band and the local band.

11. An edge filter for use in an optical network, the optical network utilizing an extended optical spectrum supporting a plurality of optical channels for transmission of optical signals within the optical network, the extended optical spectrum including at least the C-band plus one or more sub-bands, the C-band having a range of wavelengths from about 1530 nm to about 1565 nm, and each of the one or more sub-bands having a range of wavelengths including at least one optical channel outside the range of the C-band, wherein the edge filter is configured to
   segment the extended optical spectrum into a local band and an express band having different transmission specifications, the local band configured for transmission of optical signals between nodes having a relatively shorter distance therebetween, the express band configured for transmission of optical signals between nodes having a relatively longer distance therebetween;
   wherein a combination of the one or more sub-bands covers less than the L-band having a range of wavelengths from about 1565 nm to about 1625 nm and/or less than the S-band having a range of wavelengths from about 1460 nm to about 1530 nm, and
   wherein the extended optical spectrum is amplified by one or more of Erbium Doped Fiber Amplifiers and Raman amplifiers that cover a continuous spectrum in a one-band system and with at least one Gain Flattening Filter (GFF) having a tighter flatness specification in in the express band than a flatness specification in in the local band.

12. The edge filter of claim 11, wherein the combination of the one or more sub-bands covers less than half of the L-band and less than half of the S-band.

13. The edge filter of claim 11, wherein the one or more sub-bands includes a lower sub-band having a wavelength range with wavelengths less than the C-band, the wavelength range of the lower sub-band being less than half the range of wavelengths of the C-band.

14. The edge filter of claim 11, wherein the transmission specifications include one or more of Noise Factor (NF) and gain ripple.

15. The edge filter of claim 11, wherein the transmission specifications of the express band enable the optical signals transmitted by way of the express band to have a longer reach than the local band.

16. The edge filter of claim 11, wherein the extended optical spectrum includes having the one or more sub-bands overlap one another.

17. The edge filter of claim 11, further configured to segment the express band into a normal express band and an ultra-express band, wherein the ultra-express band enables a longer reach than the normal express band.

18. A node operating in an optical network, the node comprising:
- a filter connected to the optical network and configured to segment an extended optical spectrum into a local band and an express band having different transmission specifications, the local band configured for transmission of optical signals between nodes having a relatively shorter distance therebetween, the express band configured for transmission of optical signals between nodes having a relatively longer distance therebetween;
- an add/drop device configured to add and drop optical channels within the extended optical spectrum having a plurality of optical channels for transmission of optical signals within the optical network, the extended optical spectrum including at least the C-band plus one or more sub-bands, the C-band having a range of wavelengths from about 1530 nm to about 1565 nm, and each of the one or more sub-bands having a range of wavelengths including at least one optical channel outside the range of the C-band; and
- wherein a combination of the one or more sub-bands covers less than the L-band having a range of wavelengths from about 1565 nm to about 1625 nm and/or less than the S-band having a range of wavelengths from about 1460 nm to about 1530 nm, and
- wherein the extended optical spectrum is amplified by one or more of Erbium Doped Fiber Amplifiers and Raman amplifiers that cover a continuous spectrum in a one-band system and with at least one Gain Flattening Filter (GFF) having a tighter flatness specification in the express band than a flatness specification in the local band.

19. The node of claim 18, wherein the add/drop device is configured to add and drop the optical channels in one of the local band and the express band.

20. The node of claim 18, wherein the add/drop device is configured to add and drop the optical channels in both the local band and the express band.

* * * * *